(12) United States Patent  
Gibbs et al.

(10) Patent No.: US 7,758,392 B2  
(45) Date of Patent: *Jul. 20, 2010

(54) AMPHIBIOUS VEHICLE

(75) Inventors: Alan Timothy Gibbs, London (GB); Neil Graham Jenkins, Atherstone (GB)

(73) Assignee: Gibbs Technologies Ltd, Warwickshire (GB)

( * ) Notice: Subject to any disclaimer, the term of this patent is extended or adjusted under 35 U.S.C. 154(b) by 22 days.

This patent is subject to a terminal disclaimer.

(21) Appl. No.: 11/959,183

(22) Filed: Dec. 18, 2007

(65) Prior Publication Data

US 2008/0139060 A1 Jun. 12, 2008

Related U.S. Application Data

(63) Continuation-in-part of application No. 11/255,582, filed on Oct. 21, 2005, now Pat. No. 7,311,567.

(51) Int. Cl.
*B60F 3/00* (2006.01)
(52) U.S. Cl. .............. 440/12.5; 440/12.51; 440/12.52
(58) Field of Classification Search .............. 440/12.5, 440/12.54, 12.51, 12.52, 88 M
See application file for complete search history.

(56) References Cited

U.S. PATENT DOCUMENTS

| 2,400,132 | A | | 5/1946 | Porter |
|---|---|---|---|---|
| 4,387,661 | A | | 6/1983 | Duff |
| 4,744,324 | A | | 5/1988 | Martinmaas |
| 5,690,046 | A | | 11/1997 | Grzech, Jr. |
| RE36,901 | E | * | 10/2000 | Roycroft et al. .......... 440/12.52 |
| 6,182,784 | B1 | * | 2/2001 | Pestotnik .................... 180/376 |
| 6,460,907 | B2 | * | 10/2002 | Usui .......................... 293/115 |
| 6,540,569 | B1 | | 4/2003 | Gong |
| 6,672,916 | B1 | * | 1/2004 | Lent-Phillips et al. ...... 440/12.5 |
| 6,880,475 | B1 | * | 4/2005 | Thompson ............... 114/55.55 |
| 2002/0182949 | A1 | * | 12/2002 | Tanaka et al. ................. 440/88 |

FOREIGN PATENT DOCUMENTS

| JP | 2002-124308 | 4/2002 |
|---|---|---|
| WO | 2004-020228 | 7/2004 |

* cited by examiner

*Primary Examiner*—Stephen Avila
(74) *Attorney, Agent, or Firm*—Fulwider Patton LLP

(57) ABSTRACT

A planing amphibious vehicle with retractable wheels and a sit-astride seat having dimensions that impart enhanced capability in both land as well as water modes of operation. The beam, track, dead rise angle and the location of the handlebars cooperate to enhance freeboard and ground clearance without sacrificing manoeuvrability. The length is at least 1800 mm; the beam is at least 800 mm; the deadrise angle at least 3°; and the center of rotation of steering control is located near the halfway distance from transom to bow.

25 Claims, 4 Drawing Sheets

AMPHIBIOUS VEHICLE

CROSS-REFERENCES TO RELATED APPLICATIONS

This application is a Continuation-In-Part of U.S. Ser. No. 11/255,582, filed on Oct. 21, 2005 with issue date of Dec. 25, 2008 as U.S. Pat. No. 7,311,567; which claims priority from Great Britain Application Serial Nos. 0423463.9, 0423470.4, 0423474.6, 0423483.7, and 0423517.2, all filed Oct. 22, 2004.

BACKGROUND OF THE INVENTION

The present invention relates to an amphibious vehicle and, in particular, to a vehicle which can function as an all-terrain vehicle "ATV" (sometimes called "a quadbike") on land and as personal watercraft "PWC" (sometimes called a "jetski" or a "wave runner") on water.

Known PWCs are all consistent in dimension and typically have a beam of 1.15 m-1.23 m, a length of 2.93 m-3.34 m and a planing hull with a maximum dead rise angle of less than 9°.

Known ATVs are also consistent in dimension and have a maximum track width of 1220 mm (and typically have a track width of around 1150 mm) and a maximum length of 2085 mm (and typically a length of around 1850 mm).

In the past the creators of amphibious vehicles have either adapted existing PWC designs to provide limited land mode capability or have adapted existing ATV designs to provide limited marine capabilities. For instance, in U.S. Pat. No. 5,690,046 of GRZECH a PWC design is adapted with the resulting vehicle have the same dimensions as a PWC, in particular the track width of the vehicle is kept within the beam of the hull and the dead rise of the hull is conventional.

SUMMARY OF THE INVENTION

The present invention provides in a first aspect an amphibious vehicle comprising:
 a sit-astride seat;
 a planing hull;
 at least four wheels, all of which have angled retraction between a lowered ground-engaging land mode location and a raised water mode location wherein the wheels are raised to a position above the planing waterline, two of the four wheels being front steerable wheels which are, at least in the land mode of vehicle, connected to a steering control which can be operated by the driver to steer the vehicle;
 an engine which in the land mode of the vehicle is connected to at least one of the wheels to drive the wheel; a variable ratio transmission between engine and wheel; and marine propulsion means to propel the vehicle in water; wherein the marine propulsion means is a jet drive.

The present invention provides in another aspect an amphibious vehicle comprising:
 a sit-astride seat;
 a planing hull;
 at least four wheels, all of which are retractable between a lowered ground-engaging land mode location and a raised water mode location wherein the wheels are raised to a position above the planing waterline, two of the four wheels being front steerable wheels which are, at least in the land mode of vehicle, connected to a steering control which can be operated by the driver to steer the vehicle, and retract through an angle around a longitudinal axis of the vehicle;
 an engine which in the land mode of the vehicle is connected to at least one of the wheels to drive the wheel; a variable ratio transmission between engine and wheel; and marine propulsion means to propel the vehicle in water; wherein the marine propulsion means is a jet drive.

The dimensional relationships of the vehicle, provide for sufficient displacement to give adequate freeboard on water while also allowing sufficient ground clearance for land use off-road. The angled wheel retraction has been found to further enhance both land as well as water use capabilities.

The applicant has adopted an approach of having four wheels, mounted on suspension arms which place them at a track width outside the beam of the hull when in land mode; this gives good land mode operation including off-road land mode operation. Since the suspension arms extend through the hull the effective planing area of the hull is reduced and so the beam must be chosen with a certain minimum. The track width of the vehicle is then at a width much greater than that conventionally chosen for ATVs. The vehicle of the present invention is uniquely dimensioned and this provides a vehicle which is both capable on land and on water.

The vehicle has a planing surface with a dead rise angle selected to cooperate with the weight of the retracted wheels to keep the vehicle maneuverable despite a wide beam.

The steering control is far nearer the stern/rear of the vehicle than is normal in a PWC or a ATV. The center of rotation of the steering control, whether handlebars or steering wheel, is preferably between 0.3 and 0.6 of the length of the vehicle as measured from the bow. This gives good handling on water and land for a vehicle somewhat heavier than a usual PWC or ATV.

The handlebars of the ATV are typically located near the very front of the vehicle. The applicant has realised that for maneuverability both on land and water the steering control is best placed about half way along the vehicle. The enclosed volume in front of the vehicle gives buoyancy to the vehicle on water and also allows for the front wheels to be at least partly enclosed when retracted (which helps the aerodynamics of the vehicle) and further allows for a vehicle cooling system to have a forwardly located radiator, i.e. an air/water heat exchanger. An internally mounted water/water heat exchanger may additionally be included for cooling during waterborne operation.

The vehicle of the present invention is also provided with outboard foot protection for enhanced safety and comfort in both modes of operation.

These and other features and advantages of the present invention will become apparent from the following detailed description of preferred embodiments which, taken in conjunction with the accompanying drawings, illustrate by way of example the principles of the invention.

DETAILED DESCRIPTION OF THE PREFERRED EMBODIMENTS

Figure 1:
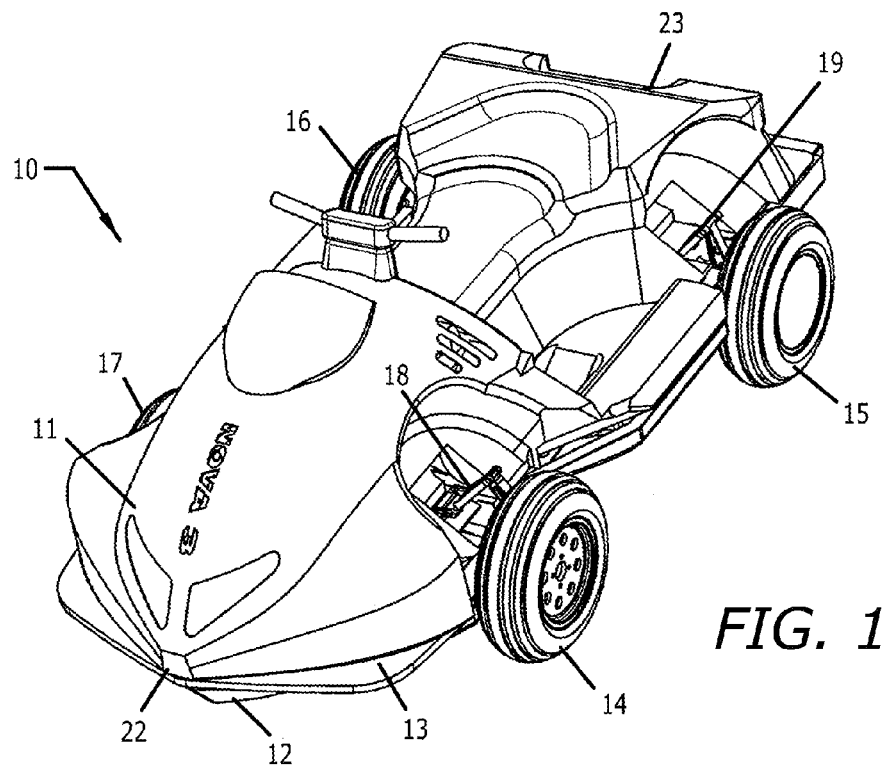
FIG. 1 is a perspective view from above of an amphibious vehicle according to the present invention.
Figure 2:
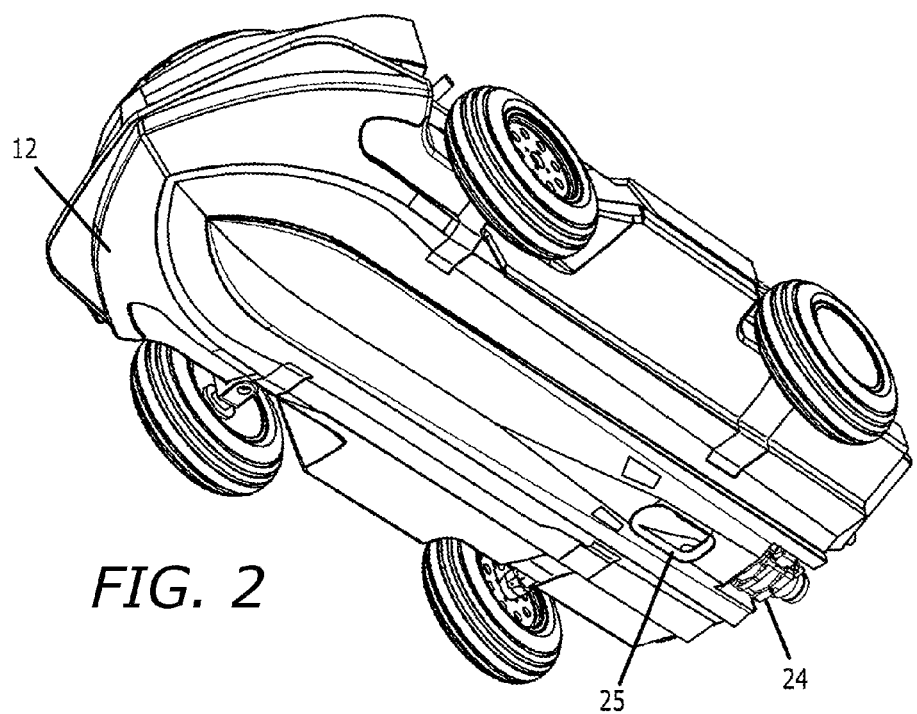
FIG. 2 is a perspective view from below of the vehicle of FIG. 1.
Figure 8:
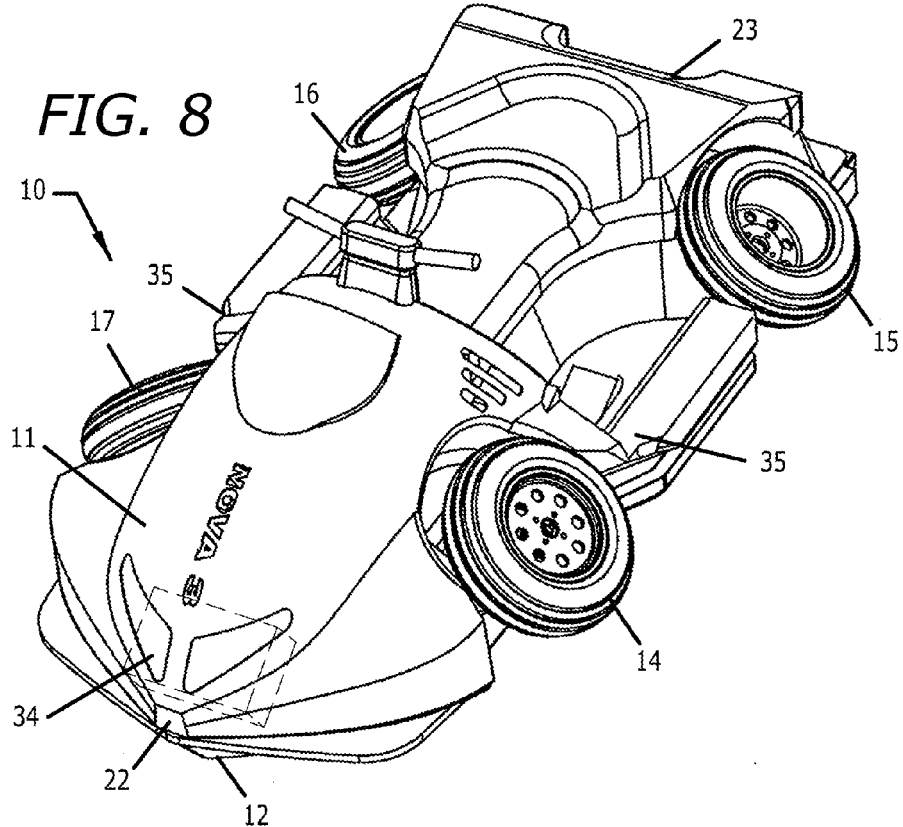
FIG. 8 is the same perspective view as FIG. 1, but with the vehicle's wheels in raised positions.
Figure 9:
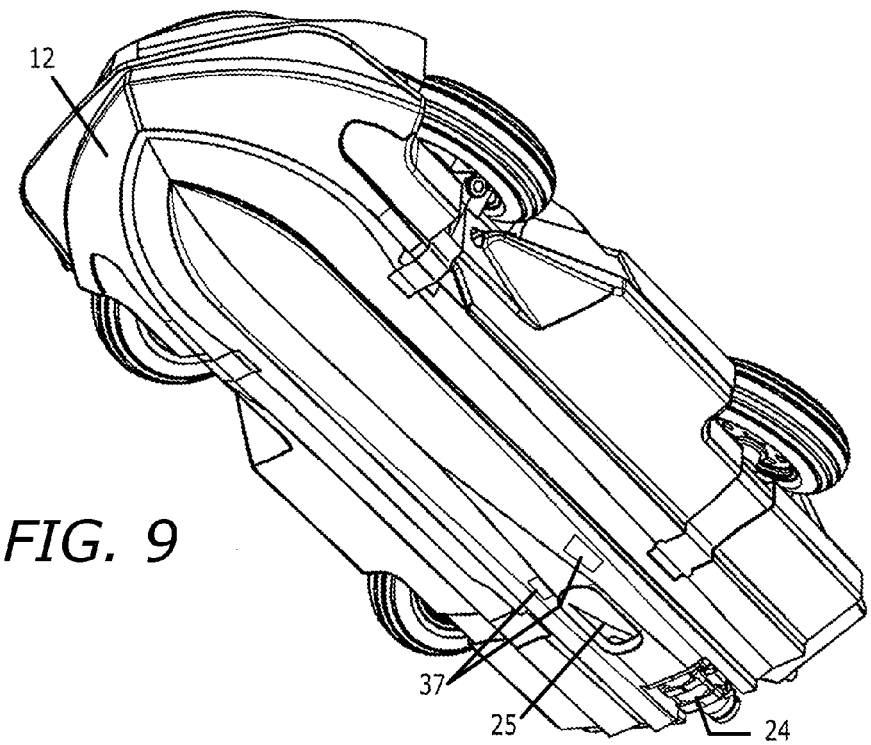
FIG. 9 is the same perspective view as FIG. 2, but with the vehicle's wheels in raised positions.

FIG. 1 shows an amphibious vehicle 10 having a body formed from a deck panel 11 and a hull 12 which are joined at a join line 13. The vehicle has four wheels 14,15,16,17 which are each rotatable for wheel retraction about an axis ($LA_1$, $LA_2$, $LA_3$, $LA_4$) running longitudinally fore and aft along the vehicle 10. A retraction mechanism can rotate the suspension arms 18,19,20,21 though at least 30° to thereby rotate the wheels 14,15,16,17 to retracted positions (see FIGS. 8,9) for marine use.

The vehicle has a bow 22 and a stern 23. A jet drive 24 powers the vehicle on water, an intake 25 being provided in the hull 12. The rear wheels 15,16 of the vehicle are driven, preferably via a continuously variable transmission.

Figure 3:
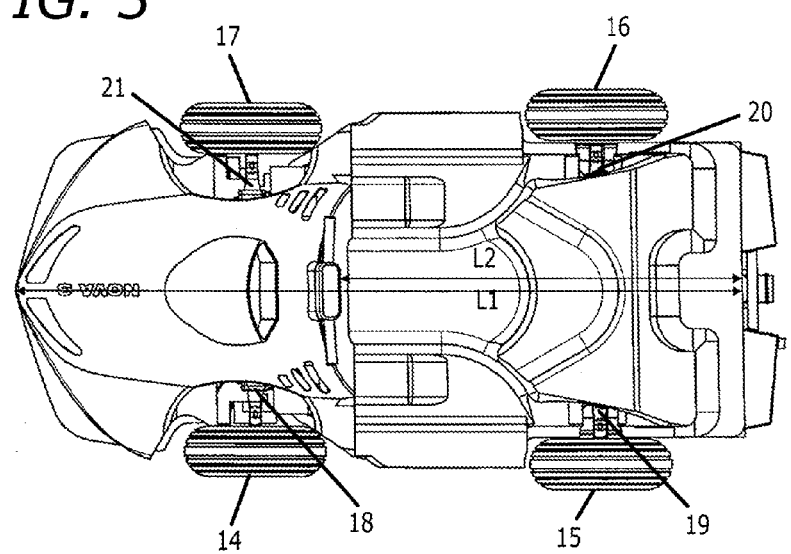
FIG. 3 is a plan view from above of the vehicle of FIGS. 1 and 2.
Figure 4:
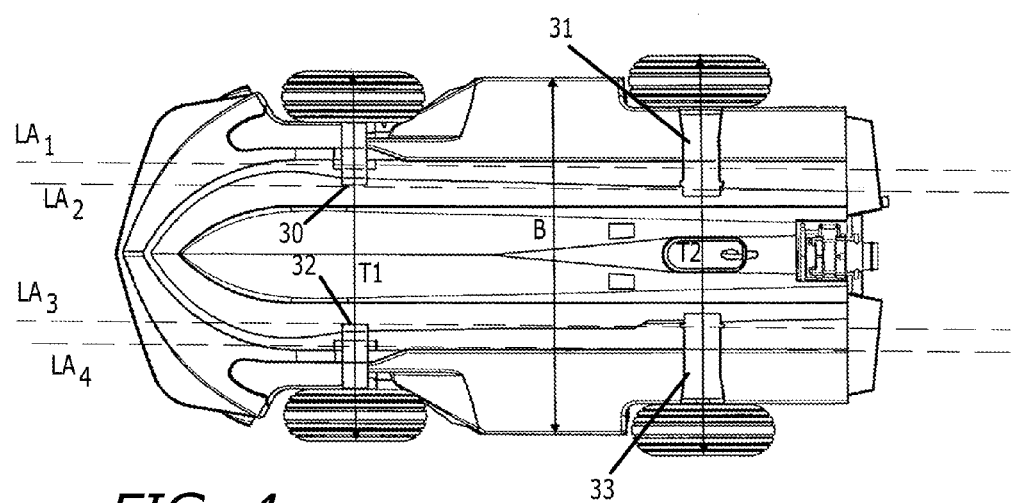
FIG. 4 is a plan view from below of the vehicle of FIGS. 1 to 3.
Figure 5:
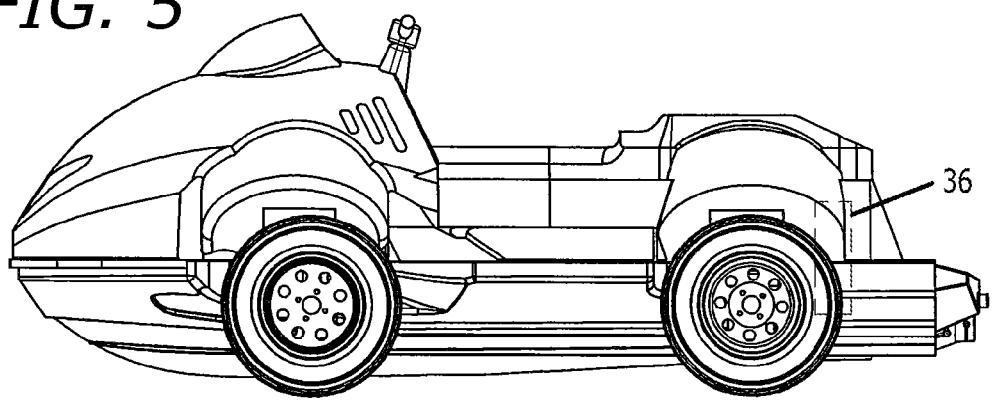
FIG. 5 is a side elevation view of the vehicle of FIGS. 1 to 4.

The wheels 14,15,15,17 are in land mode operation positioned at least in part outside the beam of the hull 12 (see FIGS. 3 and 4). The beam B is greater than 800 mm, preferably greater than 1000 mm or even 1200 mm while the outer track width T1 of the front wheels (measured from one tyre's outer extremity to the other tyre's outer extremity) is at least 50 mm greater than the beam while the rear wheels have an outer track water T2 at least 100 mm greater than the beam. The track width T2 is greater than the track width T1; the front wheels are connected to their wheel hubs in a different orientation to the rear wheels to achieve at least part of this difference. The track width T1 and T2 give good stability in land use. The track width T1 is smaller to allow for easier steering of the front wheels and a tighter turning circle.

The vehicle has an overall length of at least 1800 mm, preferably greater than 2200 mm or even 2600 mm. Such length has been found to be most advantageous for amphibious applications as such length provides for adequate planing area for waterborne operation without being overly large for use on land.

The vehicle preferably has a ratio of wheelbase (WB) to the overall length (L1) of between about 40% and 57%. While such ratio sacrifices approach and departure angles, improvement gained in terms of breakover angle and hydrodynamic bow shape have been found to most advantageous for amphibious applications.

The beam choice is important for several reasons. First, the vehicle should have a reasonable amount of freeboard when afloat. The vehicle is heavier than a PWC and so would sit deeper in the water if of the same beam. On land the vehicle needs a certain ground clearance which dictates that the draft should not be increased. Hence ensuring that the beam is above 800 mm ensures that sufficient displacement is achieved whilst achieving adequate freeboard and whilst achieving adequate ground clearance. Secondly, the need for rotating suspension arms means that the hull surface is not uninterrupted; instead apertures must be provided through which the suspension arms rotate. Covers 30,31,32,33 rotatable with the suspension arms are provided which at least in part cover the aperture when the wheels are retracted. However the planing area of the hull is nevertheless somewhat reduced and the beam must be adequate to provide for sufficient planing area that the vehicle can rise on the plane easily.

Figure 7:
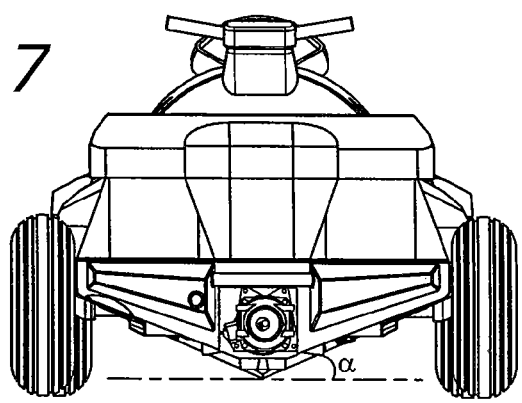
FIG. 7 is a rear elevation view of the vehicle of FIGS. 1 to 6.

The wide beam of the vehicle dictates against the use of a shallow dead rise angle for the planing area of the vehicle. Nonetheless, it has been found that the weight of the retracted wheels and suspension enable a dead rise angle $\alpha$ of as little as 3°, but preferably over 12.5° along the centre line (see FIG. 7) in a planing surface of the vehicle to provide for good maneuverability. This resists the vehicle planing transversely when cornering on water, which would be a problem due to wide beam otherwise.

Figure 6:
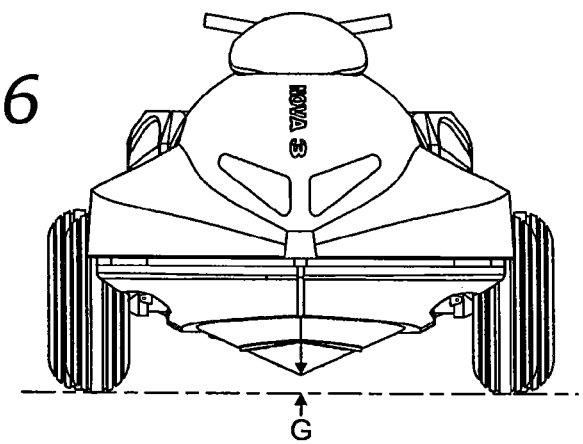
FIG. 6 is a front elevation view of the vehicle of FIGS. 1 to 5.

The overall length L1 of the vehicle is at least 1800 mm, whilst the length L2 to of the center of rotation of the steering control is between 0.3 and 0.6 of L1, preferably between 0.35 and 0.45 of (measured from the bow) the length of the vehicle. The positioning of the handlebars is unusual so as to position the driver in a location on the vehicle which meets the requirements of maneuverability on land and on water while also positioning the driver in a location to give good weight distribution to assist the vehicle getting on to the plane on water. Furthermore the bow part of the vehicle in front of the handlebars gives extra displacement to ensure good freeboard and allow the positioning of a radiator 34 (an air/water heat exchanger) in front of the handlebars in a good position for airflow. A water-water cooler 36 may be relied upon for cooling during water borne operation. A water intake 37 is positioned so as to be able to draw in cooling water while planing and while cornering. The part of the vehicle body in front of the handlebars also allows the front wheels to be partly enclosed when retracted and this assists the aerodynamics of the vehicle. Additionally, outboard foot protection 35 is provided to enhance both rider safety as well as comfort The minimum ground clearance of the vehicle on land (see FIG. 6) is 220 mm.

The present invention proposes a vehicle with a unique set of dimensions. This stems from designing a vehicle for good capabilities both on land and water, rather than adapting existing PWC and ATV designs.

While a particular form of the present invention has been illustrated and described, it will also be apparent to those skilled in the art that various modifications can be made without departing from the spirit and scope of the present invention. Accordingly, it is not intended that the invention be limited except by the appended claims.

What is claimed is:

1. An amphibious vehicle comprising:
   a sit-astride seat;
   a planing hull;
   at least four wheels, all of which have angled retraction between a lowered ground-engaging land mode location and a raised water mode location wherein the wheels are raised to a position above the planing waterline, two of the four wheels being front steerable wheels which are, at least in the land mode of vehicle, connected to a steering control which can be operated by the driver to steer the vehicle;
   an engine which in the land mode of the vehicle is connected to at least one of the wheels to drive the wheel; a variable ratio transmission between engine and wheel; and marine propulsion means to propel the vehicle in water; wherein the marine propulsion means is a jet drive.

2. An amphibious vehicle as claimed in claim 1 wherein the steering control comprises handlebars.

3. An amphibious vehicle as claimed in claim 1 wherein there are no covers beneath the retracted wheels.

4. An amphibious vehicle as claimed in claim 1 wherein at least one cooling radiator is provided at the front of the vehicle.

5. An amphibious vehicle as claimed in claim 1 wherein ambient water is passed into and out of the vehicle when the vehicle is traveling on water, to provide cooling through at least one water-water cooler within the vehicle.

6. An amphibious vehicle as claimed in claim 1 wherein footwells are provided with outboard foot protection.

7. An amphibious vehicle as claimed in claim 1 wherein at least two wheels are provided at each side of the vehicle, and none along the longitudinal centre line of the vehicle.

8. An amphibious vehicle as claimed in claim 1 wherein the vehicle has a length L and the centre of rotation of the steering control is located at between 0.3 L and 0.6 L along the vehicle length, measured from a bow of the vehicle.

9. An amphibious vehicle as claimed in claim 8 wherein the centre of rotation of the steering control is located at between 0.35 L and 0.45 L along the vehicle length, measured from a bow of the vehicle.

10. An amphibious vehicle as claimed in claim 1 wherein the hull has a beam of at least 800 mm.

11. An amphibious vehicle as claimed in claim 1 wherein the hull has a beam of at least 1000 mm.

12. An amphibious vehicle as claimed in claim 1 wherein the hull has a beam of at least 1200 mm.

13. An amphibious vehicle as claimed in claim 1 wherein the front steerable wheels are spaced apart by a track width of at least 50 mm greater than a beam of the hull.

14. An amphibious vehicle as claimed in claim 13 wherein the other wheels of the said four wheels of the vehicle are rear wheels spaced apart by a track width of at least 100 mm greater than the beam.

15. An amphibious vehicle as claimed in claim 1 wherein the angled wheel retraction rotates the wheels around a longitudinal axis of the vehicle by an angle of at least 30°.

16. An amphibious vehicle as claimed in claim 1 wherein a planing surface of the planing hull has a dead rise angle of above 3°.

17. An amphibious vehicle as claimed in claim 16 wherein the planing surface has a dead rise angle of greater than 5°.

18. An amphibious vehicle as claimed in claim 17 wherein the planing surface has a dead rise angle of greater than 10°.

19. An amphibious vehicle as claimed in claim 18 wherein the planing surface has a dead rise angle of greater than 12.5°.

20. An amphibious vehicle as claimed in claim 1 wherein the vehicle has a length L and a wheelbase WB wherein the ratio of WB/L falls between about 0.4 and 0.57.

21. An amphibious vehicle as claimed in claim 1 wherein the vehicle has a length L of at least 1800 mm.

22. An amphibious vehicle as claimed in claim 21 wherein the vehicle has a length L of at least 2200 mm.

23. An amphibious vehicle as claimed in claim 22 wherein the vehicle has a length L of at least 2600 mm.

24. An amphibious vehicle comprising:
   a sit-astride seat;
   a planing hull;
   at least four wheels, all of which are retractable between a lowered ground-engaging land mode location and a raised water mode location wherein the wheels are raised to a position above the planing waterline, two of the four wheels being front steerable wheels which are, at least in the land mode of vehicle, connected to a steering control which can be operated by the driver to steer the vehicle, and retract through an angle around a longitudinal axis of the vehicle;
   an engine which in the land mode of the vehicle is connected to at least one of the wheels to drive the wheel; a variable ratio transmission between engine and wheel; and
   marine propulsion means to propel the vehicle in water; wherein the marine propulsion means is a jet drive.

25. An amphibious vehicle as claimed in claim 24 wherein the angled wheel retraction rotates the wheels around a longitudinal axis of the vehicle by an angle of at least 30°.

* * * * *

UNITED STATES PATENT AND TRADEMARK OFFICE
CERTIFICATE OF CORRECTION

PATENT NO. : 7,758,392 B2  Page 1 of 1
APPLICATION NO. : 11/959183
DATED : July 20, 2010
INVENTOR(S) : Alan Timothy Gibbs et al.

It is certified that error appears in the above-identified patent and that said Letters Patent is hereby corrected as shown below:

Title page, insert
--(30) Foreign Application Priority Data
Oct. 22, 2004 (GB) ......... 0423463
Oct. 22, 2004 (GB) ......... 0423470
Oct. 22, 2004 (GB) ......... 0423474
Oct. 22, 2004 (GB) ......... 0423483
Oct. 22, 2004 (GB) ......... 0423517--.

Signed and Sealed this
Twenty-first Day of June, 2011

David J. Kappos
*Director of the United States Patent and Trademark Office*